(No Model.)
J. B. HANNAY.
SOUNDING APPARATUS.
No. 331,133. Patented Nov. 24, 1885.
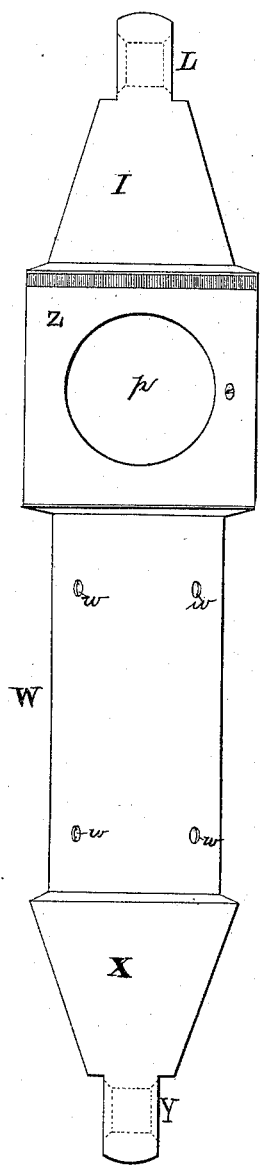
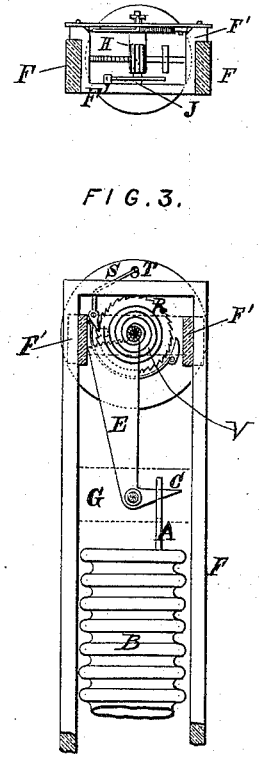
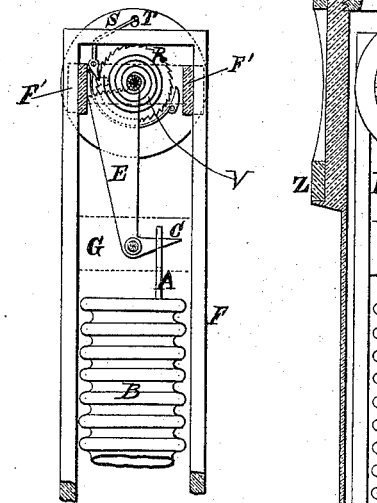
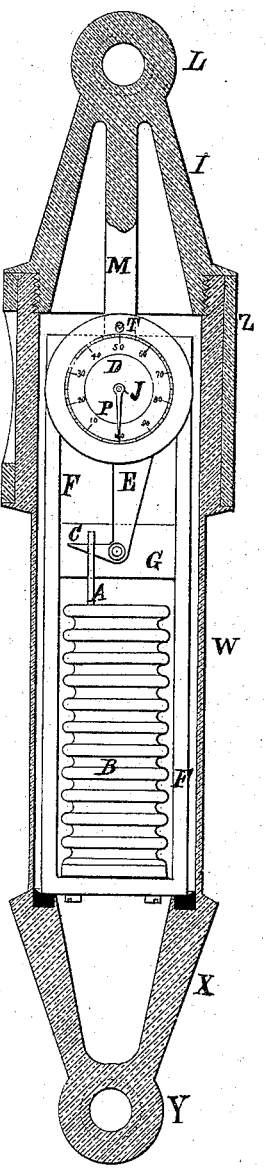
Witnesses:
George E. Gibson
Harry Drury
Inventor:
James B. Hannay
by his Attorneys
Howson and Sons

UNITED STATES PATENT OFFICE.

JAMES B. HANNAY, OF COVE CASTLE, LOCH LONG, COUNTY OF DUMBARTON, SCOTLAND.

SOUNDING APPARATUS.

SPECIFICATION forming part of Letters Patent No. 331,133, dated November 24, 1885.

Application filed July 1, 1885. Serial No. 170,339. (No model.) Patented in England November 6, 1883, No. 5,256; in France April 29, 1884, No. 161,798, and in Germany May 9, 1884, No. 29,081.

*To all whom it may concern:*

Be it known that I, JAMES BALLANTYNE HANNAY, a subject of the Queen of Great Britain and Ireland, and residing at Cove Castle, Loch Long, in the county of Dumbarton, Scotland, have invented certain Improvements in Sounding Apparatus, (for which I have obtained a patent in Great Britain, dated November 6, 1883, No. 5,256,) of which the following is a specification.

My said invention relates to sounding apparatus of the kind which is made to show the depth of water by an indication derived from the pressure of the water due to the depth.

In my improved apparatus a metal vessel acting like the main part of an aneroid-barometer or analogous pressure-gage is combined with a pointer moving over a graduated dial, and with a ratchet-wheel and catch to retain the pointer at the maximum point reached by it. This apparatus is fixed in a casing, which may have a sinking-weight attached to it, and when it is cast or lowered the pointer becomes moved in proportion to the depth reached quite independently of the length of line or of the vertical or inclined position of the line.

The precise form of my improved apparatus may be varied; but a convenient construction is shown on the accompanying explanatory drawings.

Figure 1 represents the case. Fig. 2 is a cross-section of part of the apparatus; and Fig. 3 is a back elevation, partly in section, of the indicating mechanism, shown broken at the bottom. Fig. 4 shows the case containing the apparatus in vertical section, the apparatus itself being in side elevation.

The barometric vessel B is of an elongated form, with corrugated cylindrical sides, and is fixed by its bottom end to the bottom of an elongated frame, F, to the upper end of which is fixed a small frame, F'. This small frame F' carries the graduated dial D and accessory details, and it can be removed, so that the parts can be examined or repaired. The barometric vessel B is of thin metal, and is hermetically closed. The upper end of the barometric vessel B is free to move with the varying pressure acting on the outside of the vessel, and has fixed to it a short slotted bar, A, which acts on the short arm C of a bell-crank lever, C E, centered on a pin on a cross-bar, G, of the frame. The second and longer arm, E, of the bell-crank lever has spur-teeth on its upper end, which gear directly with a pinion, H, on a spindle, J, which is at right angles to the long axis of the instrument, and which works in bearings in the dial D and small frame F'. A pointer, P, is fixed on the end of the spindle J, which projects through the dial D. The spindle J has also fast on it a finely-toothed ratchet-wheel, R, and a spring-catch, S, is arranged to engage therewith for the purpose of retaining the spindle J and pointer P in the position to which it may have been moved by the maximum pressure experienced. The end of the catch S projects through a short slot in the dial, and can be moved to release the catch after an indication of the instrument has been noted, a light volute spring, V, then returning the pointer to zero. The slot in the bar A is made long enough to allow of the barometric vessel recovering itself on the temporary pressure being removed without bearing up against the arm C of the bell-crank lever.

The barometric vessel and the indicating mechanism may be protected from corrosion by being electroplated with gold or other metal not easily corroded.

The apparatus is fitted inside of a cylindrical case, W, having holes w, to allow the pressure of the water to act on the barometric vessel B. The case W is formed with a conical end, X, which has an eye or ring to enable a weight to be attached when necessary. The upper part of this case W is made thicker than the part surrounding the vessel B, and has a circular opening, p, made in it corresponding to the dial D, which faces this opening when the instrument is in the vessel W. A sleeve, Z, fits tightly over this thicker part, and is also made with a circular opening in it corresponding to the dial D. When it is desired to see the dial D, the sleeve Z is turned round until the opening in it coincides with that in the case W; but when the instrument is about to be used the sleeve Z is turned round, so as to cover the opening in the case W, as shown in Fig. 1.

A conical cap, I, which is formed with an eye or ring, L, to which the sounding-line is attached, is provided to screw into the top of the case W. A pin, M, projects from the center of the inside of this cap I, and bears on the top of the framing F when the cap I is screwed down, thereby holding the instrument firmly in the case W.

When the instrument is to be used for extremely accurate measurements of depth, I prefer to have the acting parts entirely inclosed and the case filled up with a suitable liquid, one or more parts of the inclosing-envelope being made of a flexible material, to transmit the pressure of the external water to the interior.

What I claim as my invention is—

1. The herein-described sounding apparatus, comprising a case containing a hermetically-closed vessel free to change its form with changes of pressure, and the dial or pointer operated by said closed vessel, and devices to retain the dial or pointer in the position to which it has been moved, the whole being arranged to sink below the surface of the water, substantially as set forth.

2. The herein-described sounding apparatus, comprising a hermetically-closed vessel free to alter in form with changes of pressure, and a dial and a pointer operated thereby, with a ratchet-wheel and a catch for retaining the pointer when moved by the movement of the closed vessel, the whole being arranged in one structure, and adapted to be sunk below the surface of the water, substantially as set forth.

In testimony whereof I have signed my name to this specification in the presence of two subscribing witnesses.

J. B. HANNAY.

Witnesses:
 EDMUND HUNT,
 DAVID FERGUSON.